US007654467B2

(12) United States Patent
Takao

(10) Patent No.: US 7,654,467 B2
(45) Date of Patent: Feb. 2, 2010

(54) IC CARD CASE AND IC CARD UNIT

(75) Inventor: Hiroki Takao, Suwa (JP)

(73) Assignee: Seiko Epson Corporation (JP)

( * ) Notice: Subject to any disclaimer, the term of this patent is extended or adjusted under 35 U.S.C. 154(b) by 752 days.

(21) Appl. No.: 11/359,940

(22) Filed: Feb. 22, 2006

(65) Prior Publication Data

US 2006/0190738 A1 Aug. 24, 2006

(30) Foreign Application Priority Data

Feb. 23, 2005 (JP) ............................ 2005-046701

(51) Int. Cl.
*G06K 19/06* (2006.01)
*G06K 7/00* (2006.01)
*G06K 5/00* (2006.01)

(52) U.S. Cl. ....................... 235/492; 235/486; 235/382; 382/124; 356/71

(58) Field of Classification Search ................. 235/380, 235/382, 486, 487, 492; 382/71, 124; 713/185, 713/186

See application file for complete search history.

(56) References Cited

U.S. PATENT DOCUMENTS 6,213,403 B1 * 4/2001 Bates, III .................... 235/492
6,592,031 B1 * 7/2003 Klatt .......................... 235/382
7,337,979 B2 * 3/2008 Takao ......................... 235/492
2005/0077348 A1 * 4/2005 Hendrick .................... 235/380
2006/0097059 A1 * 5/2006 Miyazaki .................... 235/492
2006/0102728 A1 * 5/2006 Miyazaki .................... 235/486

FOREIGN PATENT DOCUMENTS

| | | |
|---|---|---|
| JP | 11-031225 | 2/1999 |
| JP | 2001-143045 | 5/2001 |
| JP | 2003-196646 | 7/2003 |
| JP | 2004-344261 | * 12/2004 |

* cited by examiner

*Primary Examiner*—Michael G Lee
*Assistant Examiner*—Keith Goodman, Jr.
(74) *Attorney, Agent, or Firm*—Harness, Dickey & Pierce, P.L.C.

(57) ABSTRACT

An IC card case storing an IC card in a case body which has an opening part formed on one side plate thereof and a fingerprint sensor set up on an internal side of other side plate thereof in a manner of facing inside the opening part, the case body includes:

a case side control controlling the fingerprint sensor and performing communications with the IC card; and a power source supplying power to the case side control, wherein the case body is constituted such that when storing the IC card inside the case body, the IC card covers over the fingerprint sensor facing the opening part.

7 Claims, 8 Drawing Sheets

(a)

(b)

(a)

(b)

IC CARD CASE AND IC CARD UNIT

BACKGROUND OF THE INVENTION

1. Technical Field

The invention relates to an IC card case and an IC card case unit.

2. Related Art

In recent years, cards containing personal information such as IC cards and credit cards have been used in electronic commerce and. the like.

To prevent illicit use of cards, some IC cards are designed such as to be used only after confirming card holder's identity by obtaining personal biometric information as a means of authenticating that a user is a rightful owner of an IC card.

As a means of obtaining personal biometric information, for example, an IC card provided with a fingerprint sensor, which uses a fingerprint as the biometric information is known (for example, refer to the first example of related art). The IC card having such fingerprint sensor performs the user's authentication (personal authentication) by reading the fingerprint information of the user through the fingerprint sensor and determining whether or not the read fingerprint information matches the fingerprint information stored in the IC card.

Now, the fingerprint sensor, being vulnerable to shock from outside, may suffer damage such as to make it impossible to provide good fingerprint authentication. Hence, it is necessary to protect the fingerprint sensor.

In cases other than the IC card, there is a fingerprint authentication device mounted with the fingerprint sensor to carry out personal identification. For example, a device, which stores the fingerprint sensor therein for protection if the fingerprint sensor is not used, is known (for example, refer to the second and third examples of related art).

Consequently, what is desired is an IC card unit which protects the finger unit sensor by storing the IC card equipped with the fingerprint sensor inside the card case.

JP-A-11-312225 is a first example of related art. JP-A-2001-143045 is a second example of related art, and JP-A-2003-196646 is a third example of related art.

Now, since the general IC card is due to be updated, for example, in three years, a new IC card must be manufactured every three years. On the other hand, the IC card equipped with the above-referenced fingerprint sensor has a higher cost when updating the card as compared to the IC card not equipped with the fingerprint sensor.

Further, since the fingerprint sensor was set up in a condition of being exposed to a surface of the IC card, when putting the IC card in and out the card case (IC card case), there was a risk of damaging the surface of the fingerprint sensor as the surface came in contact with the card case.

SUMMARY

An advantage of some aspects of the invention is to reduce a manufacturing cost of an IC card and provide an IC card case, which protects a fingerprint sensor, and an IC card unit.

According to a first aspect of the IC card case of the invention, an IC card case storing an IC card in a case body which has an opening part formed on one side plate thereof and a fingerprint sensor set up on an internal side of other side plate thereof in a manner of facing inside the opening part, the case body including: a case side control controlling the fingerprint sensor and carrying out communications with the IC card; and a power source supplying power to the case side control, wherein the case body is constituted such that when storing the IC card inside the case body, the IC card covers over the fingerprint sensor facing the opening part.

According to the IC card case of the invention, since the case body is equipped with the fingerprint sensor, it is possible to communicate a result of fingerprint authentication by the finger print sensor through the case side control to the IC card. Hence, for example, it is possible to control the IC card by means of a control signal based on a result of fingerprint authentication obtained by the IC card case. Namely, use of the IC card case enables fingerprint authentication to be carried out by the IC card without providing the fingerprint sensor in the IC card.

In this manner, the manufacturing cost when updating the IC card can be reduced by comparison to a case of providing the fingerprint sensor on the IC card. Further, the IC card functions as a lid to cover the fingerprint sensor, protecting the fingerprint sensor from external shock, dust, fine particles and the like.

An IC card unit having an IC card and an IC card case storing the IC card in a case body, the IC card case including: an opening part provided on one side plate of the case body; a fingerprint sensor provided on an inside surface of other side plate of the case body in a manner of facing inside the opening part; and a case side control controlling the fingerprint sensor and carrying out communications with the IC card; the IC card further including a card side control converting the IC card from an inactive status to an active status through communications with the case side control, wherein the case body is constituted such that when the IC card is stored inside the case body, the IC cars is in a manner of covering over the fingerprint sensor facing inside the opening part.

According to the IC card unit of the invention, fingerprint authentication is made possible by pulling out the IC card from the IC card case in a manner of facing the fingerprint sensor from the opening part. At this point, for example, if fingerprint data of the IC card holder is held in the case side control, the fingerprint acquired by the fingerprint sensor is compared to the fingerprint data held in the case side control. And, if it is verified, upon comparing the fingerprints, that the fingerprint of the IC card user and the fingerprint of the IC card holder match, the case side control controls through communications the IC card by the card side control to shift from the inactive status (unusable state) to the active status (usable state). Accordingly, the IC card becomes usable.

Namely, the IC card equipped with a fingerprint authentication function can be provided by setting up the fingerprint sensor on the IC card case side without setting up the fingerprint sensor on the IC card side. Therefore, it is not necessary to set up the finger print sensor in the IC card, so that the manufacturing cost when updating the IC card can be held down.

Further, when storing the IC card inside the IC card case, the IC card functions as a lid covering the fingerprint sensor facing the opening part, thereby protecting the fingerprint sensor from outside shock, dust, fine particles and the like.

In the IC card unit, it is preferable that the case body is provided with rails holding the IC card at a position not in contact with an outer surface of the fingerprint sensor. A setup in this manner can prevent the outer surface of the fingerprint sensor from contacting the IC card when the IC card is stored in the case body. Hence, it is possible to prevent the finger print sensor from being damaged by a load due to contact with the IC card when putting the IC card in and out the IC card case.

In the IC card unit, it is preferable that card information corresponding to the IC card case is set up in the IC card unit, so that in the IC card, there is provided a comparing section which enables communications to be carried out from the case side control to the card side control by authenticating card information of the IC card.

When, for example, the card information of the IC card and the card information of the IC card case match by authenticating the card information of the IC card through the comparing section, namely, when the IC card corresponds to the IC card case, a setup in this manner puts the IC card to the active status (usable state) through communications from the case side control to the card side control.

At this point, together with authentication by the fingerprint sensor, by authenticating a matching relationship between the IC card and the IC card case through the comparing section, two-stage authentication is carried out. Hence, security at the time of. using the IC card is further enhanced.

Moreover, since only the IC card unit which matches each other can be used normally, even in case of losing an IC card, a third party (non-holder of the IC card) not possessing the IC card case, which matches this IC card, is prevented from using the IC card.

In the IC card unit, it is preferable that a case side terminal connecting electrically to the case side control is set up in the case side control, while there is set up a card side terminal which electrically connects to the card side control and which enables communications to be carried out between the case side control and the card side control by connecting to the case side terminal.

An arrangement in this way makes it possible for the IC card and the IC card case to communicate with each other through in contact terms as the case side terminal and the card side terminal come into contact with each other. Further, it is preferable that when the IC card is pulled out of the IC card case in a manner of facing the fingerprint sensor inside the opening part, a lamp, which lights up as the case side terminal and the card side terminal come into contact with each other, is set up in the IC card case.

An arrangement in this way operates such that by confirming lighting up of the lamp, the case side terminal and the card side terminal come into contact with each other, so that the IC card can be pulled out of the IC card case to a position which enables the card side control and the case side control to communicate with each other.

In the IC card unit, it is preferable that that a transmitting section is provided in the case side control to transmit signals to the card side control, while in the card side control, there is set up a receiving section which enables communications to be carried out between the case side control and the card side control by receiving the signals in the card side control without the card side control coming into contact with the case side control.

An arrangement in this way makes it possible for the transmitting-section set up in the case side control to transmit, for example, a signal to put the IC card to the active status (usable state) and for the receiving section provided in the card side control to receive the signal, thereby enabling the IC card and the IC card case to communicate with each other in non-contact terms.

BRIEF DESCRIPTION OF THE DRAWINGS

The invention will be described with reference to the accompanying drawings, wherein like numbers reference like elements.

DESCRIPTION OF THE EMBODIMENTS

A first embodiment of the invention will be described according to the drawings.

Figure 1:
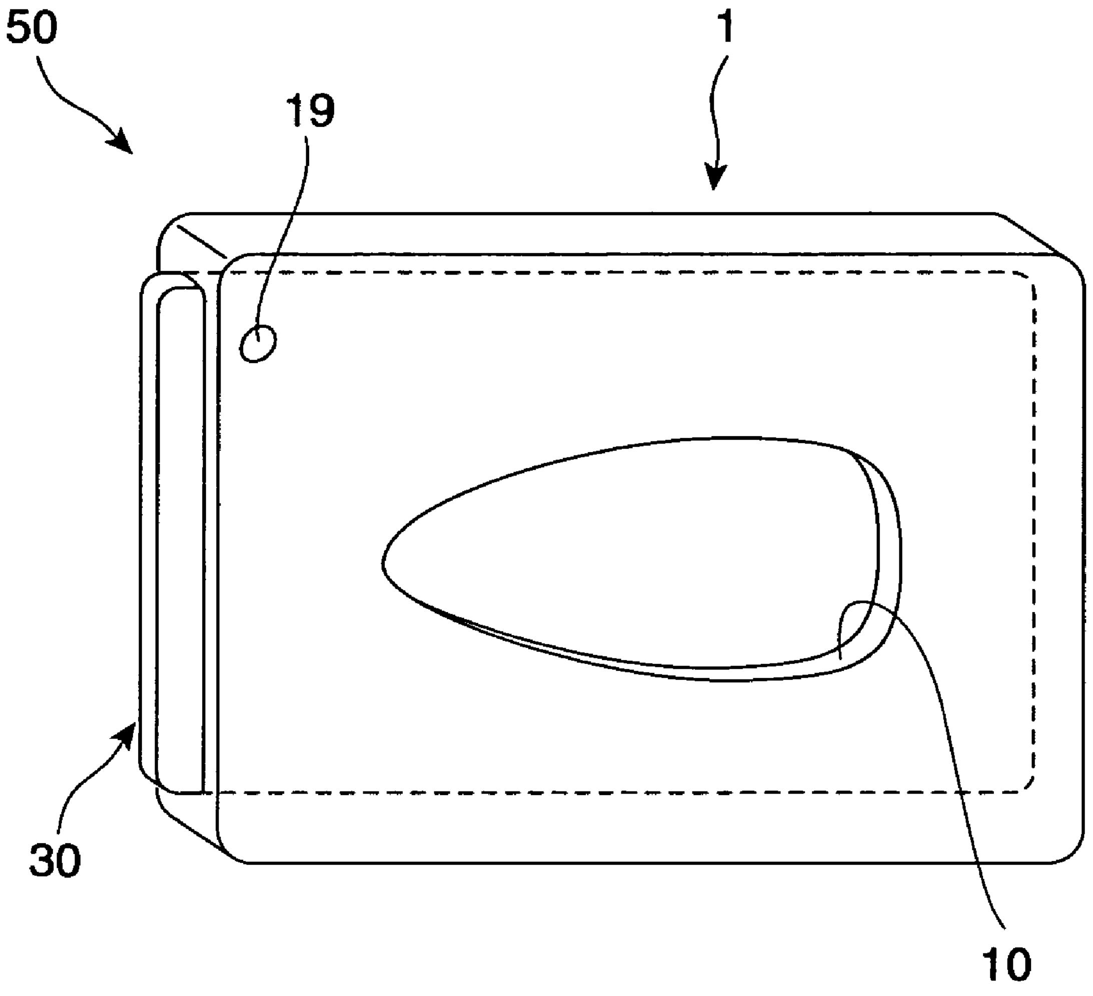
FIG. 1 is a perspective view schematically showing a construction of an IC card unit according to a first embodiment.

FIG. 1 is a perspective view showing a construction of an IC card unit 50 according to the embodiment. The IC card unit 50 includes an IC card case 1 storing an IC card and an IC card 30 stored in this IC card case 1. In the IC card case 1, an opening part 10 to be explained later is formed on one side plate of the case body.

Further, in the IC card case 1 of the embodiment, there is provided a lamp 19 which lights up when communicating with an IC card 30 as explained later. For the IC card 30, there may be cited cards in which personal information of a holder is recorded and which needs to be authenticated at the time of use, for example, a credit card, a cash dispensing card, and an employee identity card.

Figure 2:
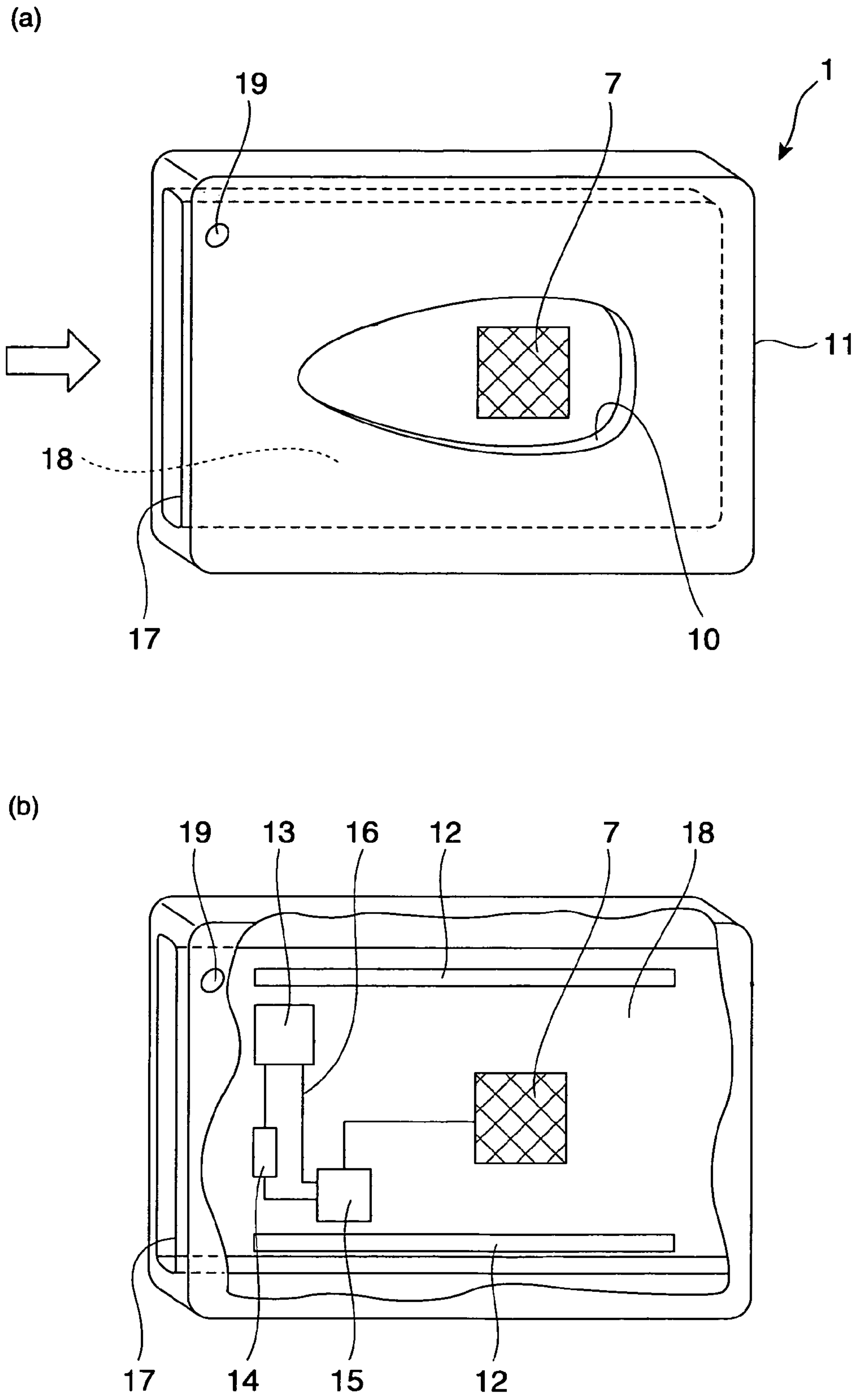
FIG. 2A is a perspective view showing an IC card case and FIG. 2B is a side view showing a storage.

FIG. 2A is a perspective view showing a construction of the IC card case 1 of the embodiment.

FIG. 2B is a diagram showing inside the storage 18 by slicing a side plate of a case body 11 on a side where the opening part 10 is formed.

As shown in FIG. 2A, the IC card case 1 is constituted by the case body 11 as a main part. The case body 11 is a box-shape member storing the IC card 30 and is formed of a resin material having flexibility. As a resin material of such property, for example, there may be used plastic materials excelling in dimensional stability such as acrylic, polyimide, polyethyleneterephthalate (PET), and polyethylenenaphthalate (PEN).

In the case body 11, there are provided a card entrance/exit 17, a storage 18, an opening part 10, and a lamp 19. It should be noted that the card entrance/exit 17 is a part for putting the IC card 30 in and out, while the storage 18, being an area formed between opposite side plates of the case body 11, is a part for storing the IC card 30.

The opening part 10 is formed on one side plate of the case body 11, while on an inner side of other side plate of the case body 11, a fingerprint sensor 7 is set up in a manner of facing inside the opening part 10.

The lamp 19 is, for example, constituted by an LED or an organic EL and when the IC card 30 is stored inside the storage 18 of the case body 11, this IC card 30 is designed to function as a lid covering the fingerprint sensor 7.

As shown in FIG. 2B, on a surface on the inner side of the side plate making up the case body 11 and making up the storage 18, there are provided the fingerprint sensor 7 and a case side IC (case side control) 15 for controlling the fingerprint sensor 7 and carrying out communications with the IC card 30 to be stored in the storage 18.

Further, a power source 14 to supply power to the case side IC 15 and a connecting terminal (case side terminal) 13 for carrying out communications by contacting a terminal of the IC card 30 to be explained later are provided. And the lamp 19 is designed to light up when the terminal of the IC card 30 and the connecting terminal 13 come into contact with each other to put the IC card 30 and the IC card case 1 in a communicative state.

The fingerprint sensor 7, the connecting terminal 13, the lamp 19, and the power source 14 are in an electrically connected state to the case side IC 15 through wiring 16. Power from the power source 14 is supplied to the case side IC 15 and the connecting terminal 13, power from the power source 14 is supplied to the fingerprint sensor 7 through the case side IC 15, and power is supplied to the lamp 19 from the connecting terminal 13.

Further, at a position not in contact with the outer surface of the fingerprint sensor 7, rails 12 holding the IC card 30 are set up in the storage 18 along a long side of the case body 11.

Figure 3:
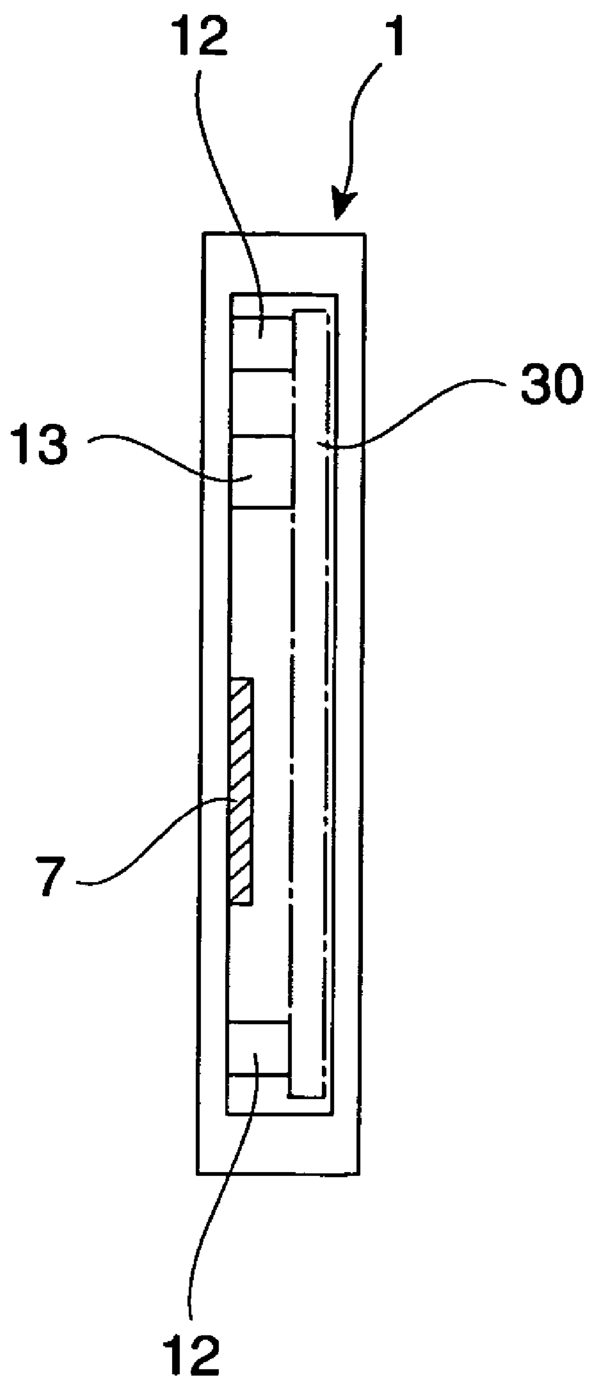
FIG. 3 is a side view looking at the IC card case from a direction of arrow in FIG. 2A.

FIG. 3 is a diagram (side view) when the IC card case 1 is looked at from a direction of arrow in FIG. 2A. The IC card 30 when stored in the case body 11 is shown herein in one-dot chain lines (virtual lines).

As shown in FIG. 3, when the IC card 30 is stored in the case body 11, the rails 12 operate to prevent the outer surface of the fingerprint sensor 7 from contacting the IC card 30. Hence, when putting the IC card 30 in and out the IC card case 1, the fingerprint sensor is prevented from being damaged due to a load caused by contacting the fingerprint sensor 7.

Further, the connecting terminal 13, as explained later, is designed to contact on the surface of the IC card 30, for example, by a spring pressure (not illustrated) and the like so as to carry out communications through contacting a terminal set up on the IC card 30 side.

It should be noted that while illustrations of the power source 14, the case side IC 15, and the wiring 16 are omitted, they are set up at positions not in contact with the IC card 30 in the same way as the fingerprint sensor 7.

Figure 4:
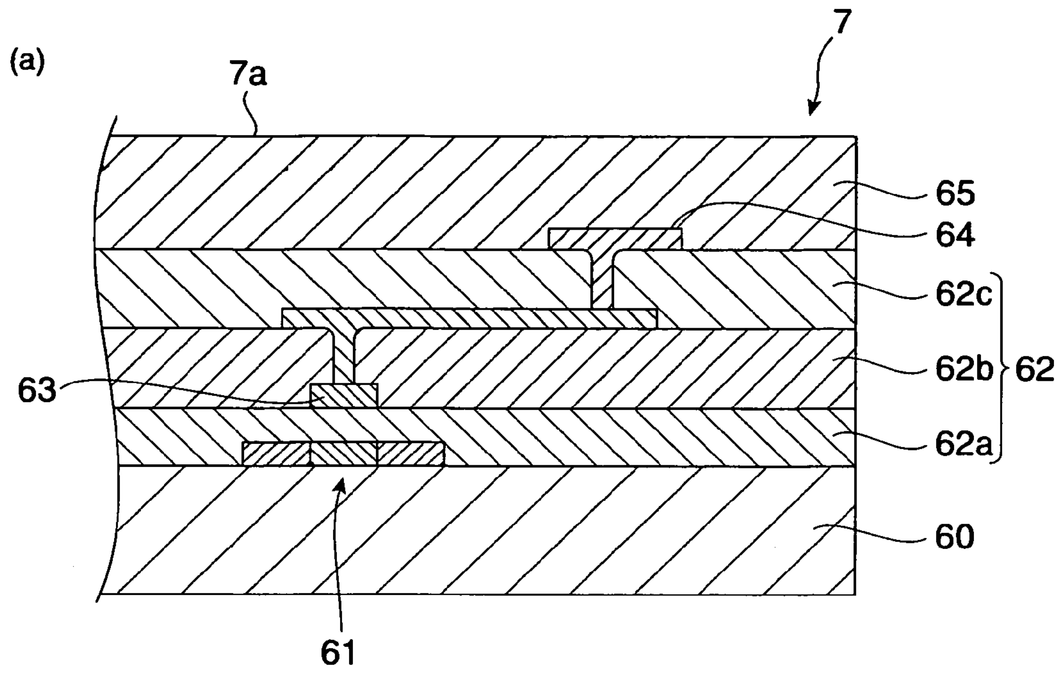
FIGS. 4A and 4B are sectional views explaining a schematic construction of a fingerprint sensor.
Figure 4:
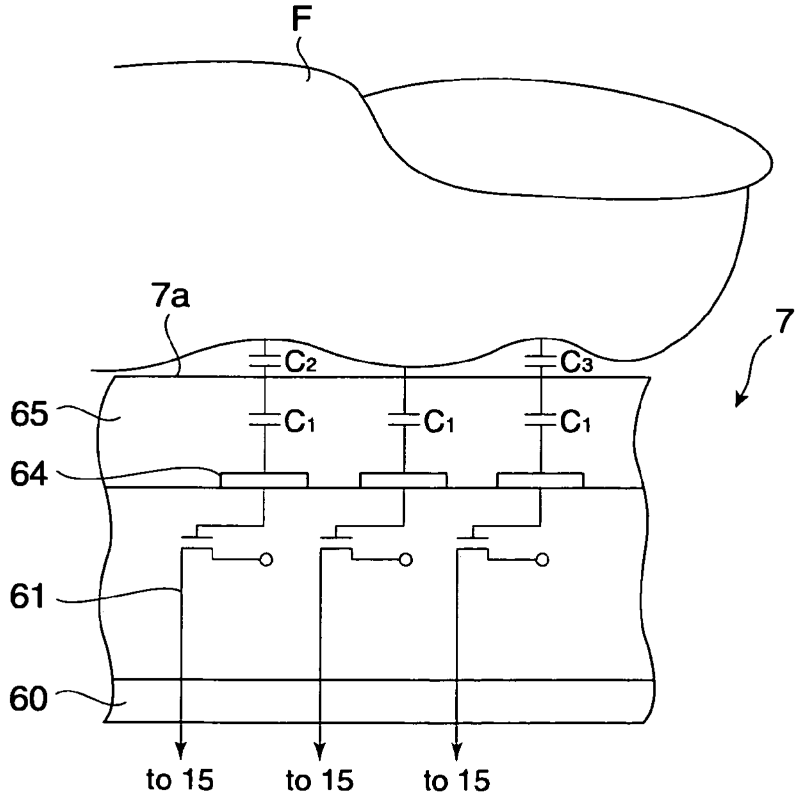

FIGS. 4A and 4B are sectional views explaining a schematic construction of the fingerprint sensor 7. The fingerprint sensor 7 is a sensor for detecting a shape of this fingerprint (fingerprint pattern) when acquiring the fingerprint as biometric information, and, as described above, is set up in a manner of facing inside the opening part of the case body 11.

This fingerprint sensor 7 is constituted by a thin-film transistor. Such thin-film transistor is formed by peeling and transcribing technology such as SUFTLA (surface Free Technology by Laser Ablation) onto a plastic base material. Specifically, a low-temperature polysilicon TFT is formed in advance on, for example, a glass substrate having good thermal resistance and transparency. Thereafter, a preset thin-film transistor is peeled by laser irradiation, and the thin-film transistor is transcribed onto the plastic base substrate and formed there.

Use of such technology makes it possible to transcribe and form a thin-film transistor, which could hitherto be formed only on a substrate such as the glass substrate that is hard and thermal-resistant, on, for example, a plastic plate which has inferior thermal resistance to the glass substrate. Consequently, it is possible to form a thin-film transistor easily on a material such as a plastic substrate having flexibility.

Specifically, as shown in FIG. 4A, the fingerprint sensor 7 has a sensor substrate 60 made up of plastic, a channel part 61 including source and drain electrodes formed on the sensor substrate 60, a gate electrode 63 set up on the channel 61 through a lower layer 62*a* of an interlayer insulating layer 62, a capacity detection electrode 64 which is connected to the gate electrode 63 and arranged in a matrix pattern on an upper layer 62*c* of the interlayer insulating layer 62, and a capacity detection dielectric film 65 provided as if covering the capacity detection electrode 64. Further, an intermediate layer 62*b* is formed between the lower layer 62*a* and the upper layer 62*c*.

As shown in FIG. 4*b*, when a finger F on whose surface a fingerprint pattern of an intricate concave and convex shape is formed is *made to contact a detection surface 7*a* of the fingerprint sensor 7, electrostatic capacity generates between the finger F and each capacity detection electrode 64 (for example, C1, C2, and C3) arranged in a matrix pattern. The quantities of electrostatic capacity C1, C2, and C3 become values corresponding to a distance between the fingerprint formed on the finger. F and each capacity detection electrode 64. Each quantity of the electrostatic capacity C1, C2, and C3 detected is designed to be transmitted to the case side IC 15.

Figure 5:
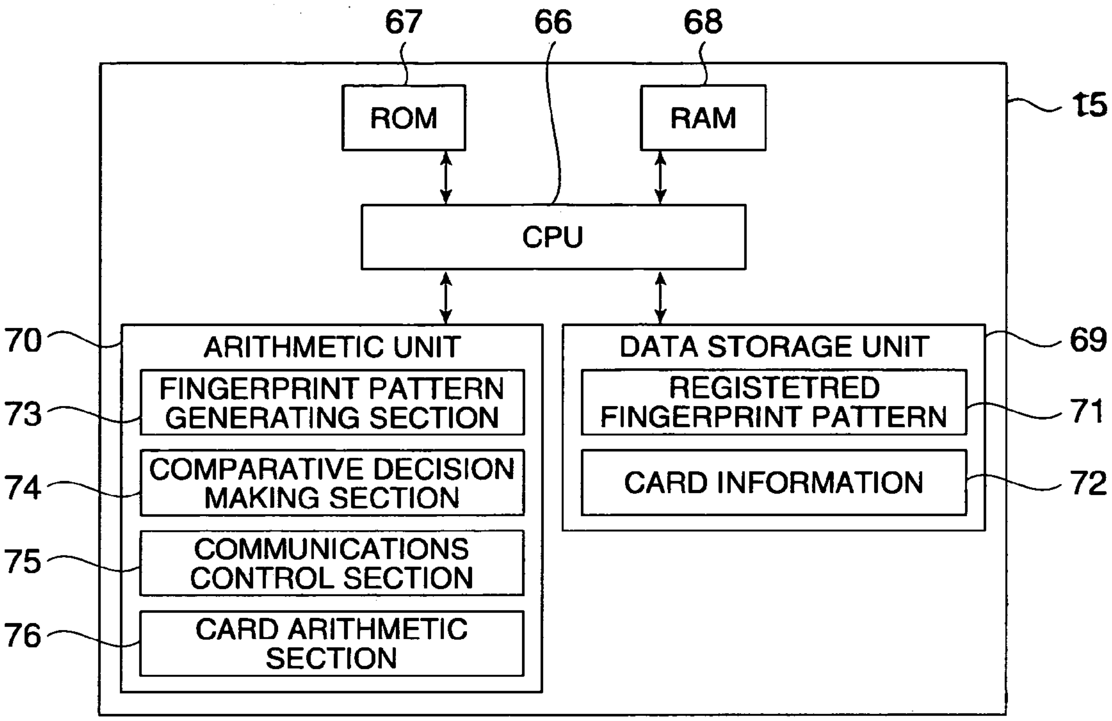
FIG. 5 is a diagram schematically showing a construction of an IC card.

As shown in FIG. 5, the case side IC 15 consists of a CPU 66, a ROM 67, and a RAM 68 for processing, a data storage unit 69 for storing data, and an arithmetic unit 70 for performing various arithmetic operations.

The data storage unit 69, for example, consists of an EEPROM (Electrically Erasable Programmable Read-Only Memory) storing pre-registered data of a fingerprint pattern (registered fingerprint pattern) 71 of an owner in the IC card 30 and card information 72 regarding the IC card 30, for example, a credit card number and an employee number.

It should be noted, as explained later, that on the IC card 30 side, too, there is provided information corresponding to the card information 72 held by the data storage unit 69 of the IC card case 1. It is to be added that "corresponding to" in the embodiment means that the IC card 30 and the IC card case 1 possess the same information (card information).

The arithmetic unit 70 is made up of a fingerprint pattern generating section 73 which calculates from the values of the quantities of the electrostatic capacity C1, C2, and C3 a distribution of distances between the finger F and the capacity detection electrodes 64 and generates a fingerprint pattern based on the distribution of distances, a comparative decision making section 74 which compares the fingerprint pattern generated in this fingerprint pattern generating section 73 to the registered fingerprint pattern stored in the data storage unit 69 and determines whether or not there is a match, a communications control section 75 which controls, based on a result of an above-referenced fingerprint authentication, whether communications between the IC card case 1 and the IC card case 30 is right or wrong, and a card arithmetic section 76 performing arithmetic operations and the like regarding card information.

Further, the arithmetic unit 70 is designed to function as a comparing section which enables communications to be carried out from the case side IC 15 to the card side IC 33 by authenticating the card information 72 held by the IC card 30, as explained later.

Next, a structure of the IC card 30 in the embodiment will be described.

Figure 6:
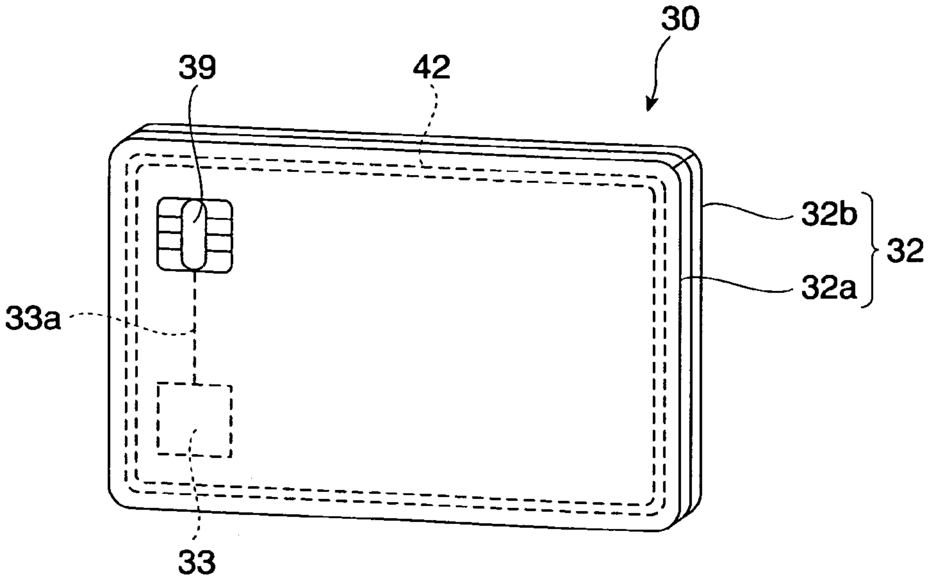
FIG. 6 is a diagram schematically showing a construction of the IC card.

FIG. 6 is a perspective view showing a construction of the IC card 30. As shown in FIG. 6, the IC card 30 is composed mainly of a card substrate 32 and a card side IC (card side functional unit) 33.

The card substrate 32 is made up, for example, by gluing together base materials 32*a* and 32*b* which are plastics and the like, and holds the card side IC 33.

Further, on the card substrate 32, there is provided an IC card side external terminal (card side terminal) 39 which electrically connects to the card side IC 33 through wiring 33*a*. It should be noted that the connecting terminal 13 of the IC card case 1 and the IC card side external terminal 39 of the IC card case 1 are set up at positions capable of contacting when pulling the IC card 30 out of the IC card case 1. And the IC card side external terminal 39, by contacting the connecting terminal 13 set up in the IC card case 1, is designed to carry out communications with the IC card case 1 through the connecting terminal 13.

Further, the IC card side external terminal 39 can be used as a contact type IC terminal which directly contacts an external device as an information exchange interface. And the IC card 30 of the embodiment also has a non-contact type IC antenna 42 receiving and transmitting waves of preset frequency with an external device (not illustrated). Namely, it is possible for the IC card 30 to carry out communications with an external device in contact or non-contact terms.

Now, a case of carrying out communications with an external device by the IC card 30 of the embodiment in non-contact terms will now be described.

Figure 7:
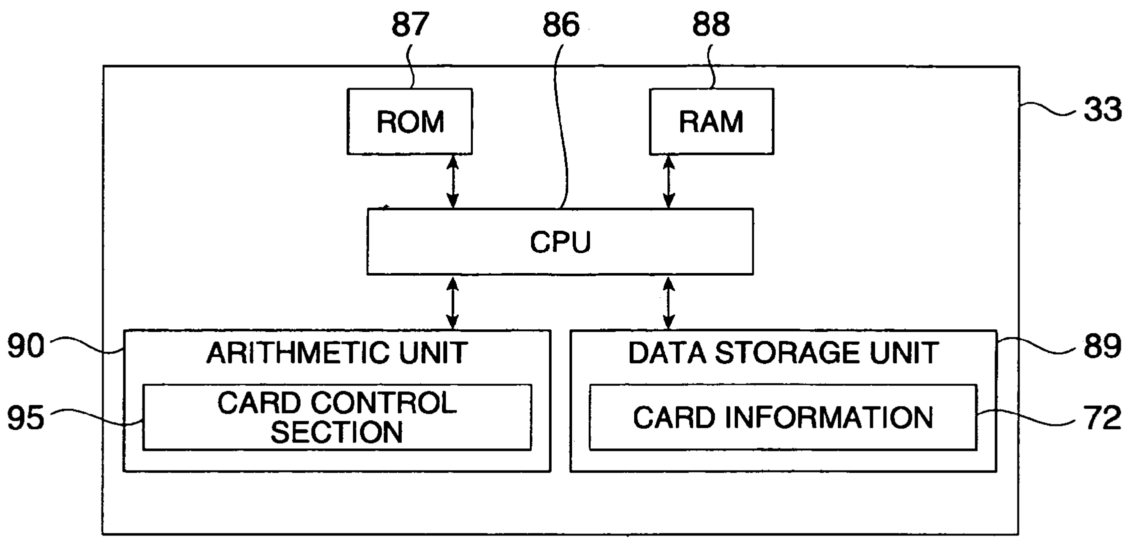
FIG. 7 is a diagram schematically showing a construction of a card side IC.

As shown in FIG. 7, the card side IC 33 has approximately the same structure as the above-referenced case side IC 15, consisting of a CPU 86, a ROM 87, and a RAM 88, a data storage unit 89, and an arithmetic unit 90. Specifically, a card information 72 which is held in the data storage unit 69 of the case side IC 15 is set up in the data storage unit 89.

In the embodiment, the IC card case 1 side and the IC card 30 side respectively have the same card information (credit card number and employee number) 72. Accordingly, the IC card 30 and the IC card case 1 correspond to each other. It should be noted that the corresponding information is not necessarily limited to the same information, so that it may be a code and the like which become fixed information by combining the IC card case 2 side information with the IC card 30 side information.

The arithmetic unit 90 has a card control section 95 which controls the IC card 30 in the active status (usable state) when the card information 72 from the case side IC 15 and the card information 72 from the IC card 30 side correspond to each other.

It should be noted that in the embodiment, a correspondence relationship between the IC card 30 and the IC card case 1 is compared by the case side. However, a comparing section may be set up on the IC card 30 side.

Next, carrying out communications with an external device using the IC card unit 50 will be described with reference to FIGS. 8A and 8B.

As the IC card 30, an employee identity card with an employee number recorded will be used as an example and described as follows. Hence, as an external device, an employee authentication system releasing a lock of a door by authenticating this employee number will be cited as an example and described.

While the IC card unit 50 is in a condition where the IC card 30 is stored inside the IC card case 1, as referenced above, the IC card 30 is in a condition where the IC card 30 covers over the fingerprint sensor 7, as a lid, facing inside the opening part 10.

Figure 8:
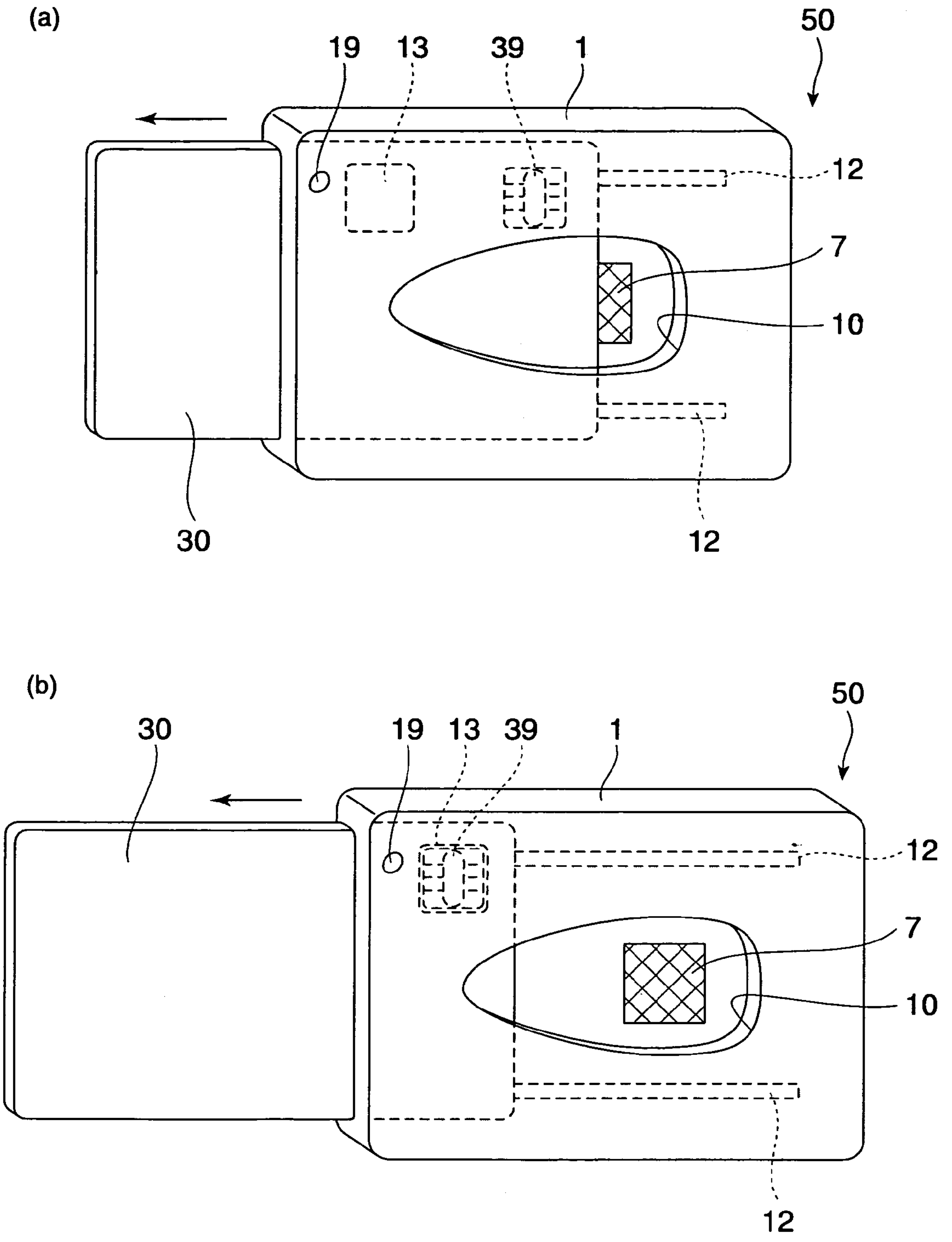
FIGS. 8A and 8B are explanatory diagrams in usage mode of the IC card unit.

First, an IC card 30 user puts a finger to the opening part 10 of the IC card case 1 and slides the IC card 30 in a direction of arrow of FIG. 8A.

Then, as shown in FIG. 8B, the connecting terminal 13 in the IC card case 1 and the IC card side external terminal 39 in the IC card 30 come into contact with each other. Then, the connecting terminal 13 and the IC card side external terminal 39 enter into a state of connection, whereby the case side IC 15 is driven by the power source 14 to put the fingerprint sensor 7 in the active status (authentication standby). At this time, the lamp 19 provided on the outer surface of the IC card case 1 lights up.

Therefore, by confirming the lighting of the lamp 19, the connecting terminal 13 and the IC card side external terminal 39 are made to be in solid contact with each other, while the IC card 30 can be pulled out of the IC card case 1 to a position such as to make the case side IC 15 and the card side IC 33 communicable.

It should be noted that when the IC card 30 and the IC card case 1 carry out communications in contact terms, it is possible to supply power from the IC card 30 side to the case side through a connecting part of the terminal, so that, for example, the power source 14 may be set up on the IC card 30 side.

After confirming the lighting up of the lamp 19, the IC card 30 user abuts the finger F from outside the IC card case 1 on to the surface 7*a* of the fingerprint sensor 7 facing the opening part 10. At this time, the fingerprint sensor 7 detects the quantities C1, C2, and C3 of the electrostatic capacity which generated between the finger F and each capacity detection electrode 64, and sends quantity values to a fingerprint pattern generating section 73 of the case side IC 15 (refer to FIG. 5).

The fingerprint pattern generating section 23, upon receipt of the quantity values of the electrostatic capacity C1, C2, and C3, calculates distances between the finger F and the capacity detection electrodes 64 from the quantity values of the electrostatic capacities C1, C2, and C3, and generates a fingerprint pattern based on the distances. And the comparative decision making section 74 reads a registered fingerprint pattern 71 pre-recorded in the data storage unit 69, and makes a decision (authentication) as to whether or not the generated fingerprint pattern matches the registered fingerprint pattern 71.

At this time, it may be arranged such that by setting up a lamp in the IC card case 1 which lights up when fingerprint authentication is properly carried out, a result of fingerprint authentication can be easily confirmed by the user, thus improving operability of the IC card 30.

Further, as referenced above, to carry out communications with an external device in non-contact terms, the IC card 30, after fingerprint authentication, may be in a condition of being stored in the IC card case 1, carrying out communications with an external device.

If it is determined by the comparative decision making section 74 that the fingerprint pattern and the registered fingerprint pattern 71 match, the communications control section 75 communicates information to the IC card 30.

On the other hand, if it is determined that the fingerprint pattern and the registered fingerprint pattern 71 do not match or fingerprint reading failed, the communications control section 75 keeps the IC card 30 in an incommunicable state. Hence, the user needs fingerprint authentication again.

Specifically, if the fingerprint patterns match, the arithmetic unit (comparing section) 70 of the case side IC 15 carries out a comparison of the card information 72 held in the data storage unit 69 of the case side IC 15 to the card information 72 held in the data storage unit 89 of the card side IC 33 through the IC card side external terminal 39 in contact with the connecting terminal 13.

Accordingly, if the card information 72 matches by comparing the card information 72 held by the IC card case 1 to the card information 72 held by the IC card 30 side (that is, the IC card 30 and the IC card case 1 correspond to each other), the case side IC 15 operates for the card control section 95 to put the IC card 30 in the active status (usable state) with respect to the card side IC 33. In this way, the IC card 30 becomes usable.

In the IC card unit 50 of the embodiment, together with authentication through the fingerprint sensor 7, authentication of the matching of the IC card 30 to the IC card case 1 using the comparing section, two-stage authentication is carried out. Consequently, security when using the IC card 30 is enhanced even more.

Further, common information of which the IC card 30 and the IC card case 1 possess, namely, only the IC card unit 50 in which both correspond to each other can properly use the IC card 30. Therefore, even in case of losing the IC card 30, a third party (party not owning the IC card 30) not in possession of the IC card case 1 corresponding to this IC card 30 is unable to use the IC card 30 easily.

As referenced above, at this point, the IC card 30 of the embodiment can carry out communications with an external device through the non-contact type IC antenna 42. Therefore, it is possible to carry out communications with the IC card 30 in a condition where the IC card case 1 (IC card side external terminal 39 in a condition of not being exposed) is stored.

Now, if the employee authentication system is in contact terms, it is certainly acceptable for the IC card 30 to be taken out of the IC card case and to carry out communications by the IC card side external terminal 39 in contact terms.

After the IC card 30 is put in the active status (usable state), the card side IC 33 transmits communications signals through the non-contact type antenna 42 to an employee authentication system (external device) not illustrated, while transmitting necessary information for authenticating the employee's identity such as the employee number stored as the card information 72 in the data storage unit 89.

When the employee authentication system receives a communications starting signal as well as information necessary for authenticating the employee's identity, the employee authentication system determines if this employee number matches the registered number.

Since the result of determination showed the matching of the employee numbers, the door lock is released and a communications termination signal is transmitted to the IC card 30. When the card side IC 33 received the communications termination information from the authentication system through the non-contact type IC antenna 42, the IC card 30 is again brought to the incommunicable state.

Accordingly, the IC card 30 is not usable unless authenticated again by the fingerprint sensor 7, thus remaining in a state where security is maintained. This completes communications between the employee authentication system and the IC card unit 50.

If communications with the employee authentication system are to be continued from this state, all that is required is for the user to abut the finger F again on the surface 7*a* of the fingerprint sensor to put the IC card 30 in the communicable state.

According to the IC card unit 50 of the invention, by taking out the IC card 30 from the IC card case 1 in a manner of facing the fingerprint sensor 7 from the opening part 10, fingerprint authentication by the fingerprint sensor 7 is carried out. At this point, the fingerprint data acquired by the fingerprint sensor 7 is compared to the fingerprint data held in the case side IC 15 and the matching of the IC card 30 user's fingerprint and the IC card 30 holder's fingerprint is authenticated. The case side IC 15 communicates this to the card side IC 33 so that the IC card 30 is controlled from the inactive status (unusable state) to the active status (usable state). Then, it is made possible to make the IC card 30 usable.

Namely, by installing the fingerprint sensor 7 on the IC card case 1 side, the IC card 30 equipped with a fingerprint authentication function can be provided without setting up the fingerprint sensor on the IC card 30 side. Hence, because of no need to set up the fingerprint sensor 7 in the IC card 30, it is possible to cut down the manufacturing cost when updating the IC card 30.

Further, when storing the IC card 30 inside the IC card case 1, the IC card 30 functions as a lid covering the fingerprint sensor 7 facing the opening part 10, thus protecting the fingerprint sensor 7 from outside shock, dust, fine particles and the like.

Next, a second embodiment of the IC card unit will be described.

In the embodiment, description regarding the same construction as the first embodiment will be simplified and the like numbers reference like elements for the description.

The IC card unit in the embodiment is such that a transmitting section for transmitting signals to the card side IC 33 is set up on the case side IC 15. On the card side IC 33, there is provided a receiving section to enable communications to be carried out between the case side IC 15 and the card side IC 33 by receiving the signals without contacting the case side IC 33.

Figure 9:
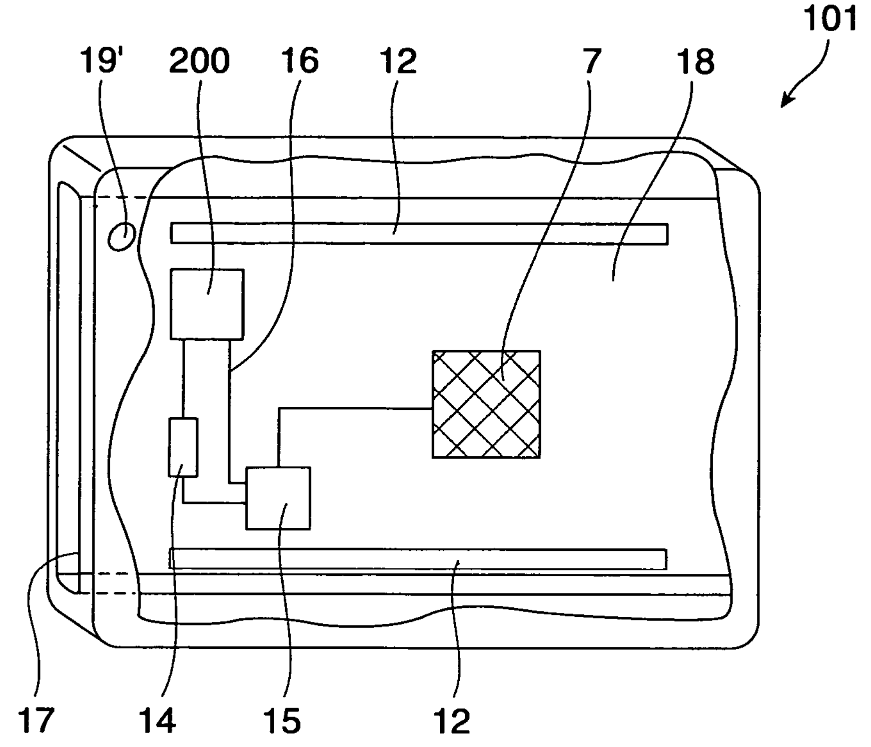
FIG. 9A of a second embodiment is an IC card.
FIG. 9B is an IC card case.
Figure 9:
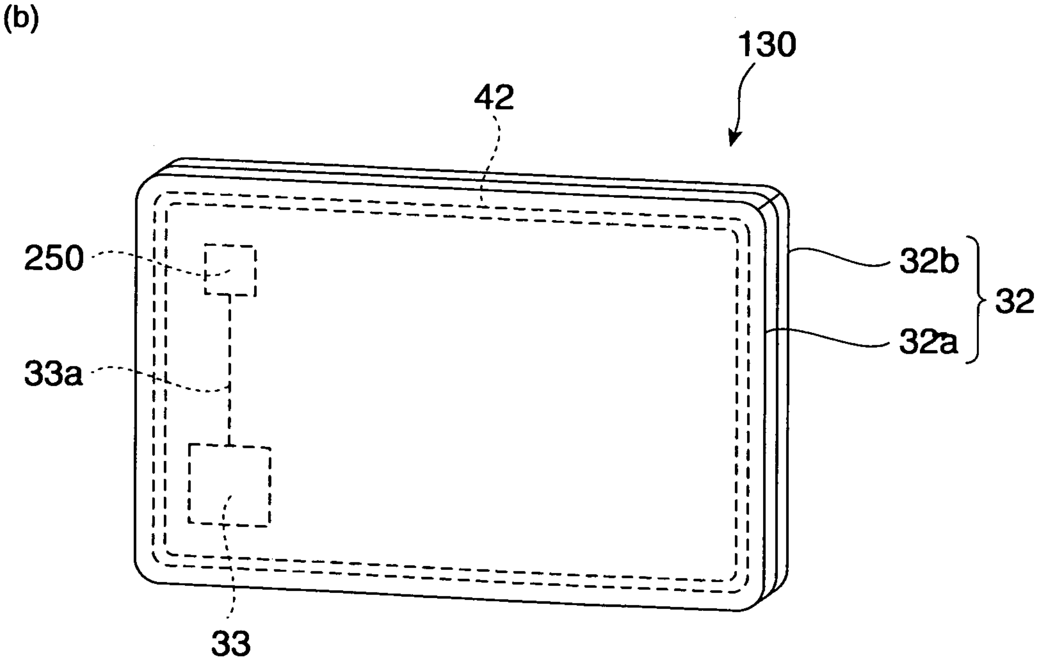

FIG. 9A is a diagram schematically showing a construction of an IC card case of the embodiment. As shown in FIG. 9A, in an IC card case 101, a transmitting section 200 for transmitting signals to the card side IC 33 in non-contact terms is set up in lieu of the connecting terminal 13 in the IC card case 1. This transmitting section is arranged such as to be electrically connected to the card side IC 33 through the wiring 16 and to be controlled by the card side IC 33.

Now, other constituents of the IC card case 101 are the same as the IC card case 1 of the first embodiment, consisting of a case body 11, a fingerprint sensor 7 facing inside the opening part, rails 12 holding the IC card so as not to let the IC card to be in contact with the fingerprint sensor 7, the case side IC 15, and the power source 14. Further, in the embodiment, there is provided a lamp 19' consisting of an LED and the like to show a state of communications between the card and the case by lighting up.

Incidentally, the IC card unit of the embodiment has a switch to drive the power source 14 for supplying power to the case side IC 15 so as to carry out communications while the IC card and the IC card case 101 are in the non-contact state.

In the embodiment, for example, by setting up a switch (not illustrated) at a lower part of the fingerprint sensor 7, as the user pushes the fingerprint sensor 7 by the finger F, the power-source 14 is turned on by the switch. Consequently, by means of the power source 14, the case side IC 15, the fingerprint sensor 7 and the like are activated, thus enabling fingerprint authentication to be carried out.

It should be noted that power is arranged to be supplied from the power source 14 to the case side IC 15 at least until the IC card assumes the active status (usable state).

Next, an IC card 130 in the embodiment will be described.

In the IC card 130, in lieu of the IC card side external terminal 39 in the IC card case 1, there is provided a receiving section 250 which receives signals from the transmitting section 200 set up in the IC card case 101 and enables communications to be carried out between the case side IC 15 and the card side IC 33.

Further, for another constituent element of the IC card 30, in the. same way as the IC card 30 of the first embodiment, there is provided an IC antenna 42 of the non-contact type receiving and transmitting waves of preset frequency among the card substrate 32, the card side IC 33, and an external device.

An IC card unit 150 in the embodiment is constituted by such IC card 130 and the IC card case 101.

Next, description will be made of a case where communications are carried out with an external device using the IC card unit 150 in the embodiment.

In the same way as the first embodiment, in the following description, an employee identity card having a registered employee number is used as an example of the IC card 130. Hence, as an external device, an employee authentication system which releases the lock of a door by authenticating this employee's number is cited as an example for description.

First, an IC card 130 user puts a finger into the opening part 10 of the IC card case 1 and slides the IC card 130. And the IC card 130 is made to slide until the fingerprint sensor faces the opening part 10. Next, the IC card user abuts the finger F on the fingerprint sensor 7 facing inside the opening part 10. At this time, in the IC card case 101 of the embodiment, a switch (not illustrated) provided on a reverse side of the fingerprint sensor 7 turns on by pushing the fingerprint sensor 7. At this time, the lamp 19' lights up.

Then, after the case side IC 15 is driven by the power source 14 and the fingerprint sensor assumes a standby status, a fingerprint of the finger F on this fingerprint sensor 7 is authenticated.

Now, a decision (authentication) is made as to whether or not the fingerprint pattern read by the fingerprint sensor 7 matches the fingerprint data pre-recorded in the case side IC 15.

At this time, if the fingerprint authentication is properly carried out, it may be arranged such that notifying the result of the fingerprint authentication to the user, for example, by making the lamp 19' blink contributes to improving the operability of the IC card unit 150.

In the same way as the first embodiment, when it is determined by the comparative decision making section 74 that the fingerprint pattern read by the fingerprint sensor 7 matches the registered fingerprint pattern 71, the communications control section 75 communicates to the IC card 130.

The case side IC 15 communicates to the card side IC 33 in non-contact terms through the transmitting section 200. Then, the receiving section 250 set up in the card side IC 33 receives signals from the transmitting section 200 in non-contact terms.

It should be pointed out that in the embodiment, the transmitting section 200 is likewise supposed to be capable of transmitting. but also receiving signals therebetween and the receiving section 250. Further, the receiving section 250 is supposed to be capable of receiving signals but also transmitting signals therebetween and the transmitting section 200.

Accordingly, the case side IC 15 can carry out comparison of the card information 72 held in the card side IC 33 in non-contact terms through communications between the transmitting section 200 and the receiving section 250. And, if the card information 72 matches (that is, the IC card 30 and the IC card case 1 correspond to each other), the case side IC 15 sends to the card side IC 33 a signal that puts the IC card 30 in the active status (usable state).

At this time, the lamp 19' which has been on goes off. Hence, the user confirms from the lamp 19' going off that the IC card 130 assumes the usable state and removes the finger F. Then, the switch (not illustrated) set up on the reverse side of the fingerprint sensor 7 is in the off state, thereby suspending power supply from the power source 14 to the case side IC 15.

In this manner, the IC card 30 becomes usable.

Accordingly, it is made possible to use the IC card 130 with respect to the external device (employee authentication system). Now, the IC card 130 can communicate with the external device in non-contact terms. It should be noted that in the same way as the first embodiment, by setting up an external terminal (IC card side external terminal 39) separately in the IC card 130, communications may be carried out between the external device and the IC card 130 in contact terms.

The IC card 30, by carrying out communications therebetween and the employee authentication system (external device), releasing the lock of a door, and transmitting the communications termination signal to the IC card 130, again, assumes the inactive status (unusable state).

This completes communications between the employee authentication system and the IC card unit 50 in the embodiment.

It should be pointed out that the invention is naturally not limited to the above-referenced embodiments and can be modified in various ways without departing from a gist of the invention.

The entire disclosure of Japanese Patent Application No. 2005-046701, filed Feb. 23, 2005 is expressly incorporated by reference herein.

What is claimed is:

1. An IC card case storing an IC card in a case body which has an opening part formed on one side plate thereof and a fingerprint sensor set up on an internal side of other side plate thereof in a manner of facing inside the opening part, the case body comprising:

- a case side control controlling the fingerprint sensor and carrying out communications with the IC card; and
- a power source supplying power to the case side control, wherein the case body is constituted such that when storing the IC card inside the case body, the IC card covers over the fingerprint sensor facing the opening part.

2. An IC card unit having an IC card and an IC card case storing the IC card in the case body, the IC card case comprising:

- an opening part provided on one side plate of the case body;
- a fingerprint sensor provided on an inner side of other side plate of the case body in a manner of facing inside the opening part;
- a case side control controlling the fingerprint sensor and carrying out communications with the IC card; and
- a card side control converting the IC card from a inactive status to an active status through communications with the case side control, wherein the case body is constituted such that when the IC card is stored inside the case body, the IC card is in a manner of covering above the fingerprint sensor facing inside the opening part.

3. The IC card unit according to claim 2, wherein the case body is equipped with rails holding the IC card at a position not in contact with an outer surface of the fingerprint sensor.

4. The IC card unit according to claim 2, wherein card information corresponding to the IC card case is provided in the IC card, and a comparing section is provided in the IC card case for enabling communications to be carried out from the case side control to the card side control by authenticating card information of the IC card.

5. The IC card unit according to claim 2, wherein a case side terminal electrically connecting to the case side control is provided in the case side control, and the card side terminal enabling communications to be carried out between the case side control and the card side control by electrically connecting to the card side control and contacting the case side terminal is provided in the card side control.

6. The IC card unit according to claim 5, wherein a lamp which lights up when the case side terminal comes into contact with the card side terminal at the time of pulling the IC card out of the IC card case in a manner of facing the fingerprint sensor inside the opening part is provided in the IC card case.

7. The IC card unit according to claim 2, wherein a transmitting section transmitting a signal to the card side control is provided in the case side control, and a receiving section enabling communications to be carried out between the case side control and the card side control by receiving the signal without contacting the case side control is provided in the card side control.

* * * * *